United States Patent [19]
Williams et al.

[11] Patent Number: 5,260,730
[45] Date of Patent: Nov. 9, 1993

[54] OPTICAL OVERHEAD PROJECTOR FOR ELECTRONIC IMAGES

[75] Inventors: Richard E. Williams; Ernest F. Clough, both of Lake Mary; Mark L. Daniel, Deltona, all of Fla.

[73] Assignee: Numa Corporation, Lake Mary, Fla.

[21] Appl. No.: 8,503

[22] Filed: Jan. 25, 1993

[51] Int. Cl.5 .............................................. G03B 21/00
[52] U.S. Cl. .................................... 353/122; 353/101; 353/DIG. 3
[58] Field of Search .......... 353/122, DIG. 3, DIG. 5, 353/101, 100, 97, 52, 57, 120

[56] References Cited

U.S. PATENT DOCUMENTS

| | | | |
|---|---|---|---|
| 4,728,184 | 3/1988 | Kyhl | 353/122 |
| 4,904,079 | 2/1990 | Yoshimura et al. | 353/122 |
| 4,953,971 | 9/1990 | Highfill | 353/122 |
| 5,168,294 | 12/1992 | Davis et al. | 353/DIG. 5 |

Primary Examiner—William A. Cuchlinski, Jr.
Assistant Examiner—William C. Dowling

[57] ABSTRACT

A relatively small liquid-crystal display (LCD) device located well above the fresnel stage of an overhead projector produces large, sharp images with full color and motion. A focus-correcting lens moves with the overhead projector's optical head to maintain proper projection-focus and magnification. Spectrally-selective filters are interposed between the LCD device and fresnel stage to avoid LCD deterioration. A fan-actuated shutter or electrically-actuated shutter optionally provide still further protection. Optical collimation methods are employed to attain a large depth-of-field and image brightness.

10 Claims, 2 Drawing Sheets

OPTICAL OVERHEAD PROJECTOR FOR ELECTRONIC IMAGES

BACKGROUND AND SUMMARY OF THE INVENTION

This invention relates to overhead projection devices and more specifically to a projector employing a liquid-crystal display (LCD) to project electronic images such as those of color television. Overhead projectors are in widespread use and are found in hundreds of thousands of classrooms and meeting areas. With the advent of computers, video recorders, laser discs, etc., there has been an increasing need to provide a convenient and effective way of producing a large-screen display of such information. LCD plates placed upon overhead projector stages are being used, but they are expensive due to their necessarily-large display areas, and tend to deteriorate from stage heat.

Other solutions have included separate projectors or television sets, but the combined cost is high and several units in a room are space-consuming and frequently inconvenient. That contrasts with the widely-accepted permanent positioning of an overhead projector and its screen. Accordingly, a primary object of the present invention is to extend the capabilities of an overhead projector to handle TV and computer imaging at relatively low cost with high quality. A small LCD device used in the invention is placed above and away from the projector stage to minimize heat problems. The overhead optics are unchanged but are augmented by an additional low cost element to provide very high optical efficiency.

In one embodiment of the invention all components are provided in a single small removable package. The package contains all necessary optical elements, an LCD device, heat-controlling components, and an electrical interface. The projected picture can be large and bright, and typically has the width of a standard overhead-projection image. The total package weight is less than ten pounds, and a maximum dimension is in the order of ten inches. The invention produces negligible heat and consumes merely four watts of power. In other embodiments the invention can be permanently or semi-permanently attached to an overhead projector with a greater number of shared features.

In a preferred separate-package embodiment the invention optics are resiliently mounted to provide automatic and simple coupling to the optics already provided in an overhead projector. The projector's focusing adjustment then can control the invention's optics, maintaining proper focus and magnification throughout an entire focusing range.

Another object of the invention is to exploit the efficient collimated-ray feature of an overhead projector. Its depth-of-field and image sharpness are largely due to the manner by which its light rays pass through a typical overhead transparency at nearly right angles to the transparency's surface and later enter the projection lens in a similar manner. Lens aberrations are reduced, and the transparency can be shifted away from a mid-focus position a considerable distance before defocusing sets in. The present invention maintains that feature in an inexpensive manner by imposing a focusing lens only immediately prior to the first surface of the overhead projector's optical head. In a highly-light-efficient version, light collection and collimating elements are interposed between the LCD device and the stage. Even when the LCD device is far away from the stage, the TV image is sharp, bright, and easily focused without expensive lenses.

Still another object is to remove the LCD device from the relatively hot stage so that heat transmission can be controlled and cool operation achieved. The invention provides spectral optical filtering and other protective measures to prevent potentially harmful components of the overhead projector's radiation from reaching the LCD.

These and other features of the invention will become apparent from the following description when taken in conjunction with the accompanying drawings wherein.

DETAILED DESCRIPTION

Figure 1:
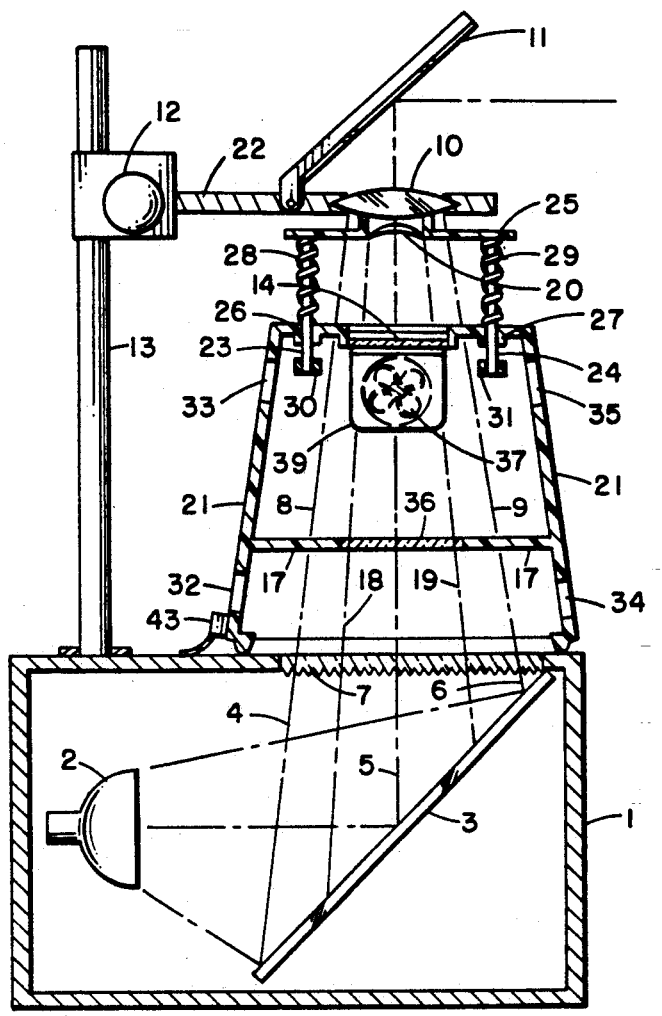
FIG. 1 is a cross-sectional view of a preferred embodiment of the invention.

FIG. 1 illustrates the relationship of the major elements of the present invention to those found in a typical overhead projector. It is a cross-sectional view of the combination. The base of the overhead projector 1 contains a light source 2 and a mirror 3 to cause light rays 4, 5, 6 to project vertically through fresnel lens 7 which comprises the overhead projector's stage surface. In some commercial projectors mirror 3 is absent and source 2 is below the fresnel stage and radiating upward. Normally a transparency (not shown) is placed upon the stage surface, and rays 8, 5, 9 will, in the absence of the present invention, project through the fresnel 7 and transparency directly to projection lens 10 and mirror 11. The rays, focused by lens 10, are then projected to a screen to form an enlarged image of the transparency.

Lens 10 is brought to a focus position by means of an adjustment knob 12 that causes the optical head comprising lens 10 and mirror 11 to move vertically on support shaft 13. The optical head position relative to the stage, or more specifically, to the image contained on a transparency, determines the focus. The hitherto cited elements are normally found on conventional overhead projectors, and are not unique to this invention. There are two features that are significant to the invention, however. One is that marginal rays 8 and 9 are efficiently captured by the projection lens at angles that do not depart substantially from paraxial. The second is that rays 4, 5, 6 pass through the transparency at angles nearly perpendicular to its surface. The two features lead to an unusually good depth-of-field and sharp image despite very simple optics with high optical speed (typically one large positive lens with an f-speed better than 3.3). The present invention is able to retain most of those advantages despite a large change in the nature and position of the image-creating source.

Any image capable of being displayed by an LCD device can be optically projected by the invention. Computer displays or moving TV images can be projected to large sizes in full color. An LCD device, however, requires very careful control of its environment. The LCD cell employs a liquid that becomes permanently unusable if it is subjected to excessive heat, cold, mechanical stress, or certain forms of radiation. Thin polarizing films on its surfaces can be damaged by excessive heat, scratching, etc. Some of the problems are aggravated if the device's size is increased, and its cost increases rapidly with size. In short, a small size and benign environment are desirable. Neither is met if the LCD panel is positioned close to the fresnel stage surface.

Referring again to FIG. 1, the LCD device 14 is placed near the top of a structure having supports. For appearance purposes, and to prevent the spreading of light, the supports may comprise walls substantially enclosing the structure. Unlike a photographic image source, an LCD device has a significant thickness. Excessively oblique light rays cause a decrease in contrast ratio due to front-to-rear misregistration, and it is desirable that incident rays deviate minimally from perpendicular to the surface. To assist in that regard, intercept unnecessary heat-producing radiation, and reduce stray light stemming from inevitable imperfections in fresnel 7, an optical baffle 17 that also may act as a support for unique optical filter 36 is imposed in the light path to block marginal rays 4 and 6. Only less-oblique rays such as 18 and 19 are able to progress to LCD device 14 and on to focus-correcting lens 20. Moreover, after passing through the LCD device, less-oblique rays can be readily captured by the small, high optical-speed lens 20.

In the embodiment shown, lens 20 is resiliently affixed to the main structure 21. The high optical speed of lens 20, despite a relatively small lens diameter, in part stems from the close proximity of the lens to LCD 14. F-numbers (ratio of focal length to lens diameter) in the order of 2.0 are quite feasible. Lens 20 can be a single positive element if placed close to projector lens 10. The light ray collimation reduces aberrations, and the resulting projected image quality is substantially indistinguishable from that of the overhead projector alone.

The need for close proximity between lenses 10 and 20 to avoid vignetting, aberrations, etc., requires either that the lenses both be affixed to the projector head assembly 22, or that another means be provided to assure proper positioning. Such a means resides in resilient supports 23 and 24. Lens 20 is affixed to opaque panel 25. The panel must be opaque to block light rays that may bypass lens 20 and directly reach overhead-projector lens 10. The latter lens is defocused to the LCD image, and such rays would cause deterioration of the projected image.

Opaque panel 25 is affixed to support shafts 23 and 24. The latter are able to slide into structure 21 through bearings 26 and 27. Springs 28 and 29 cause opaque panel 25 to assume an upper position restricted either by lens 10 or limiting collars 30 and 31. Thus if the structure 21 is not positioned upon the overhead projector, or the projector's head 22 is raised to a very high level, the collars retain the opaque-panel assembly. On the other hand, when the structure 21 is active on the projector, raising or lowering the optical head 22 will cause lens 20 to remain close to the first surface of lens 10 and provide automatic focusing as the head is adjusted. Although a pair of support shafts 23, 24 are shown, it is clear that other arrangements using leaf springs, a single shaft, etc., can provide the necessary contacting resiliency without departing from the spirit of the invention.

Figure 2:
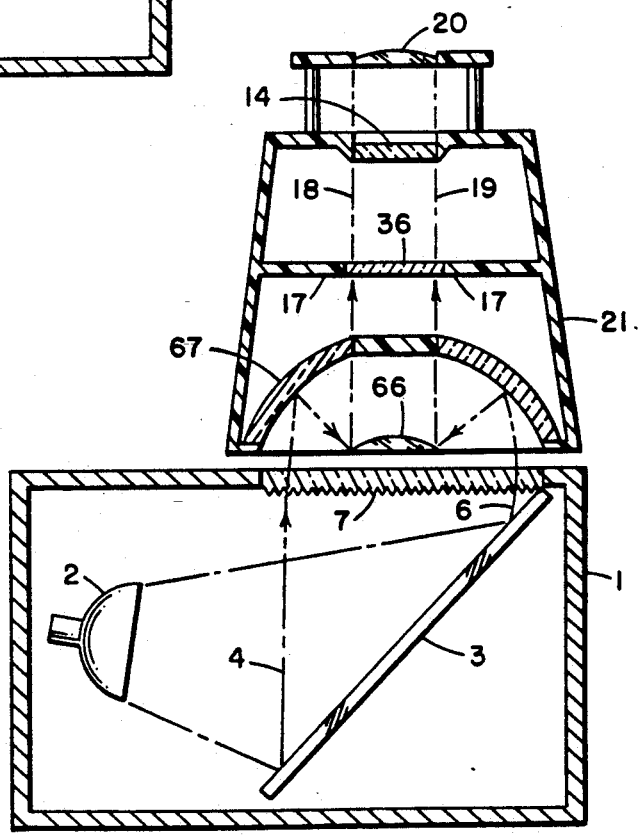
FIG. 2 is a cross-sectional view of a modification of the invention of FIG. 1 to increase light efficiency.

An optional additional light-collimating process is shown in FIG. 2. Its advantage is greater light efficiency. For clarity only the elements involved in the alternate optics are shown; other elements remain as shown in FIG. 1. Referring to FIG. 2, overhead-projector components comprising source 2, mirror 3, and fresnel 5 remain unchanged. Marginal rays 4 and 6 are reflected from a concave mirror 67 onto a convex mirror 66. An aperture in the center of mirror 67 allows the light rays to progress through filter 36 to LCD 14. The marginal rays thus have not been blocked, but instead have been rendered substantially parallel and centered as shown by rays 18 and 19. The usable annulus surrounding convex mirror 66 has a larger area than the aperture area of filter 36, and greater projected image brightness results.

Although concave mirror 67 is shown, as is known to those skilled in the arts, the same optical results can be obtained with a planar mirror-backed fresnel. In that case the fresnel-mirror's reflecting characteristic is chosen to match that of mirror 67. In both cases the mirrors can be of the "cold" type so as to reflect only visible light. Destructive longer-wavelength radiation then impinges harmlessly upon baffle 17 acting as a heat sink.

Figure 6:
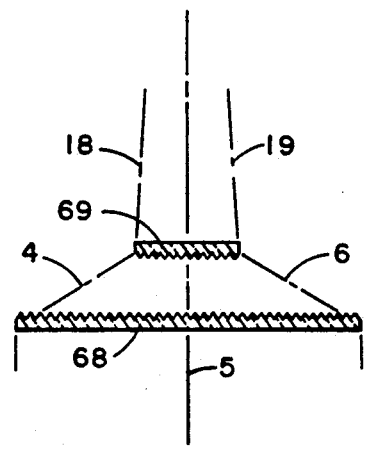
FIG. 6 is a representative alternate method of obtaining the light-concentrating feature of FIG. 2.

Instead of employing reflective elements 66 and 67, an alternate embodiment can refract the light rays as shown in FIG. 6. A positive fresnel lens 68 of very short focal length rapidly converges rays 4 and 6 onto negative fresnel 69. Rays 18 and 19 exiting the negative fresnel are then as shown in FIG. 2. Further optical arrangements using, for example, all positive elements, combinations of reflective and refractive elements, etc., can be used without departing from the intent of the invention to reduce the effective area of the overhead projector's stage while capturing a maximum amount of light.

Overhead projector light source 2 of FIG. 1 almost always dissipates more than a hundred watts of power. It is normally a filamentary lamp, often of the halogen type. More than sixty percent of the wattage may appear in the form of heat. Of the three forms of heat transfer; conduction, convection, and radiation; the third is of greatest concern to the present invention. The first, conduction, is easily minimized by avoiding conductive paths from the lamp to the LCD device. Non-metallic structures generally satisfy that requirement. The second, convection, can be managed by causing rising air currents to pass outside of the structure. Ports 32, 33, 34, and 35 can create the proper air flow by creating a 'chimney effect' wherein outside air enters at the bottom, heats, and then rises to exit at the top. Almost all overhead projectors additionally have a fan in conjunction with source 2 to create forced convection of much of the heat to the outside of the projector.

Heat-producing radiant energy is more difficult to manage because the path from source 2 to LCD device 14 must be transparent to the visible part of the radiant spectrum. It is necessary to selectively remove ultraviolet and infrared portions of the spectrum. One method is to replace mirror 3 in the overhead projector base with a "cold mirror". The latter has the ability to reflect visible light while allowing infrared components to pass through and impinge upon wall 1. The wall then can act as a heat sink and most of the infrared energy is removed from the rays reaching the LCD device. Some commercial projectors do not employ mirror 3, and substitution is thereby impossible. Others already have a cold mirror to protect LCD panels that may be placed directly upon the fresnel stage, but a detachable and portable structure cannot rely upon a cold mirror in all encountered projector bases.

Again referring to FIG. 1, an optical spectral filter 36 capable of reducing detrimental heat transmission is interposed between fresnel stage surface 7 and LCD device 14. The filter can be much smaller than mirror 3, and its cost is normally considerably less. Filter 36 preferably includes an infrared reflecting capability, but may employ a heat-absorbing component or other control methods. Elements for such purposes are commercially available in various forms.

Ultraviolet portions of the radiant spectrum are easier to control, and filter 36 of the invention is preferably also provided with an ultraviolet-blocking capability. Many visibly-transparent plastics and glasses are opaque to ultraviolet, and a typical filamentary lamp produces far less radiant energy in that region than in the infrared. With both infrared and ultraviolet rejection capabilities, filter 36 thus can prevent deleterious non-visible radiant energies from reaching the LCD device.

Another heat problem may remain, however. Typically from two to fifteen percent of source 2 wattage reaches the LCD device in the form of visible (and therefore necessary) energy. When the LCD blocks portions of that energy to create an image, energy is converted to heat in the LCD. Low transmission efficiency also causes a heat rise in the LCD. Additional protective steps are necessary to avoid LCD deterioration or destruction.

As is well known, an LCD functions by first filtering an input polarization plane out of the random polarization of incoming light, controllably twisting that plane in response to electrical image data, and then using another polarizing filter to transmit components corresponding to image brightness values. It thus has controllably-transparent zones corresponding to image data. Typically an LCD's input polarizer provides less than 25% transmission (although 50% is the theoretical maximum). Seventy-five percent or more of the incident visible-light energy may not get beyond the input polarizer, and thus may be converted into heat at that point. Apart from the possibility of damage to the thin-film polarizer, the polarizer is in intimate contact with the liquid-crystal cell and the heating occurs at a bad location.

If pre-polarization in the same plane as that of the input filter is imposed upon the light prior to its arrival at the LCD, the LCD's input polarizer can be eliminated, thus removing its heat generation. Even if the polarizer is left in place, its heat burden is lifted because it will transmit almost all of the pre-polarized light. Accordingly, filter 36 is preferably additionally provided with a pre-polarization capability. Since it is interposed between source 2 and LCD 14, and is spaced from the LCD, it removes the heat of input polarization to a safer location. Moreover, filter 36 can have a larger radiative surface area than the LCD and can suffer less heat rise because of lower energy density. The pre-polarization feature of the filter can be provided by a layer of commercially-available polarizing material.

Although the various filtering functions of infrared reduction, ultraviolet reduction, and pre-polarization have been described as residing in filter 36, it is to be understood that the functions may physically reside in separate layers or multiple elements. When imposed, however, they must be located in the optical path between source 2 and LCD 14.

Figure 3:
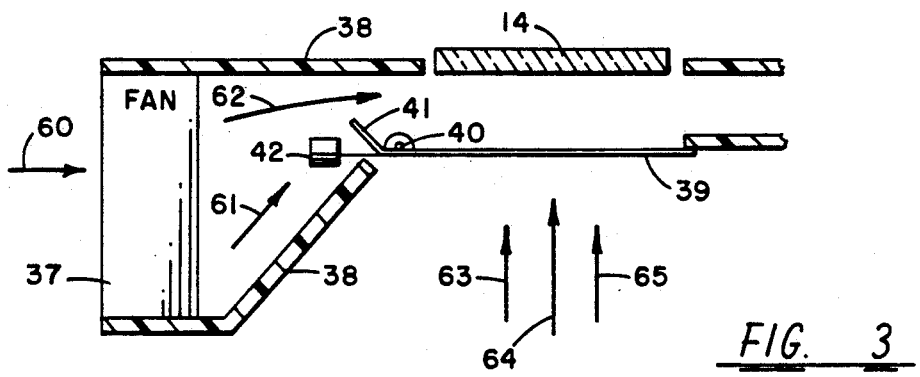
FIG. 3 is a detail drawing of a fan-activated protective shutter.

Some overhead projectors produce more than a thousand watts at source 2, and even with the pre-polarization and radiant filtering measures, additional heat may have to be removed from the LCD by forced convection. In a preferred embodiment, fan 37, baffle 38, and shutter 39 at the location shown in FIG. 1 can provide the necessary protection. Referring now more specifically to FIG. 3, details of the arrangement can be seen. Air currents designated by 60, 61, and 62 are brought from the outside by fan 37. Baffle 38 creates a venturi effect to speed up the air flow and cause it to move at a high rate across the surface of LCD 14. Shutter 39, shown edge-on, is very lightweight and typically fabricated of thin reflective aluminum. It is pivoted at point 40 and normally is in a closed position to prevent light rays 63, 64, 65 arriving from source 2 from reaching the LCD. Closure is assured by a small counterweight 42 or by a conventional spring. The air flow created by fan 37 presses against vane 41, part of shutter 39. The pressure causes the shutter to pivot open only if the air is flowing at a satisfactory rate. Accordingly, if the overhead projector of FIG. 1 is energized while structure 21 is sitting upon it, the LCD is protected even if no electrical connection has been made to the fan 37.

Figure 4:
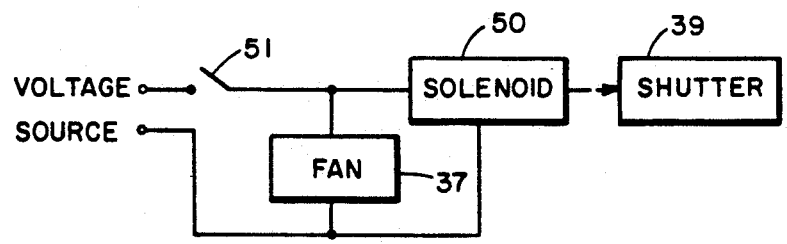
FIG. 4 is an alternate electrical method of activating the shutter of FIG. 1 and FIG. 3.

A slightly different shutter actuation process is schematically portrayed in FIG. 4. The normally-closed shutter 39 opens only when solenoid 50 is energized. That occurs when a user turns on the LCD display system via switch 51, automatically activating fan 37. Thus, the fan and shutter always operate in coincidence.

Figure 5:
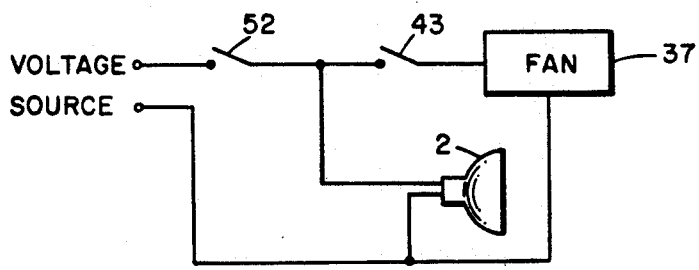
FIG. 5 is a protective electrical arrangement usable with a physical attachment to the overhead projector.

The protective-shutter features described above apply primarily to a detachable image producer; i.e., where the invention is used by simply placing it upon an existing overhead projector. When a unified assembly including both is involved, certain simplifications can be made. Since a physical attachment is assured, sensing switch 43 in FIG. 1 can sense whenever LCD 14 is in position over the stage. The electrical arrangement of FIG. 5 then can assure that the LCD device will be protected. Main switch 52 normally activates light source 2. When sensing switch 43 is closed by placing the LCD over the stage, fan 37 is activated whenever source 2 is energized. In that case shutter 39 is unnecessary.

It is evident that the various protective features of the invention can be used in assorted combinations depending upon the severity and nature of the heat threat. While the invention has been particularly shown and described with reference to preferred embodiments thereof, it will be understood by those skilled in the arts that various changes in form and details may be made therein without departing from the spirit and scope of the invention.

What is claimed as new and desired to be protected by Letters Patent is set forth in the appended claims.

We claim:

1. A device for LCD image projection in an overhead projector having a light source projecting an array of light rays through a fresnel stage to a controllably-positioned optical projection head having a first surface, comprising:

an LCD device containing a transparency image;

a structure to locate said LCD device in said array of light rays at a location that provides an interposed space between said device and said stage; and a focus-converting lens resiliently attached to said structure and substantially restrained by said first surface, whereby said lens will move in concert with said optical head.

2. The device as set forth in claim 1, further comprising:

an opaque panel affixed to said focus-converting lens to prevent any portion of said array of light rays from reaching said optical head without passing through said focus-converting lens.

3. The device as set forth in claim 1, further comprising:

a heat-blocking spectral filter located in said interposed space, whereby said filter reduces heat transmission from said source to said LCD device.

4. The device as set forth in claim 1, further comprising:

a pre-polarizing filter located in said interposed space, wherein the polarization plane of said filter is substantially coplanar to an input-polarization requirement of said LCD device.

5. The device as set forth in claim 1, further comprising:

an ultraviolet-rejecting filter located in said interposed space.

6. The device as set forth in claim 1, further comprising:

a fan producing an air flow to cool said LCD device; and a normally-closed heat-intercepting shutter in said interposed space, whereby said shutter is caused to open by said air flow.

7. The device as set forth in claim 1, further comprising:

a fan to cool said LCD device;

a normally-closed heat-intercepting shutter located in said interposed space; and solenoid shutter-control means connected electrically in parallel with said fan, whereby said shutter opens only upon electrical energization of said fan.

8. The device as set forth in claim 1, further comprising:

a fan to cool said LCD device; and switching means to electrically connect said fan in parallel with said source when said means is actuated by placing said structure over said stage, whereby the fan is electrically actuated whenever the source is energized.

9. The device as set forth in claim 1, further comprising:

optical collimation means affixed to said structure in said interposed space to direct marginal light rays from said stage to said focus-converting lens through said LCD device.

10. An overhead projector for transparencies and images produced by an LCD device, comprising:

a light source producing an array of light rays;

a vertically-adjustable optical head having a first surface;

a substantially transparent fresnel stage;

first structure means to support said head relative to said light source and said fresnel stage, whereby said stage directs said array to said optical head;

an LCD;

second structure means to controllably support said LCD between said stage and said optical head;

a focus-correcting lens; and third structure means to substantially affix said focus-correcting lens to said head's first surface when said LCD is between said stage and said head, thereby substantially correcting the focus of said head for proper projection of any image produced by said LCD.

* * * * *